United States Patent
Kim et al.

(10) Patent No.: US 11,126,833 B2
(45) Date of Patent: Sep. 21, 2021

(54) ARTIFICIAL INTELLIGENCE APPARATUS FOR RECOGNIZING USER FROM IMAGE DATA AND METHOD FOR THE SAME

(71) Applicant: LG ELECTRONICS INC., Seoul (KR)

(72) Inventors: Jaehong Kim, Seoul (KR); Taeho Lee, Seoul (KR); Hyejeong Jeon, Seoul (KR); Jongwoo Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 88 days.

(21) Appl. No.: 16/547,006

(22) Filed: Aug. 21, 2019

(65) Prior Publication Data
US 2020/0050842 A1    Feb. 13, 2020

(30) Foreign Application Priority Data

Jul. 23, 2019   (KR) ................ 10-2019-0089157

(51) Int. Cl.
*G06K 9/00* (2006.01)
*G06K 9/46* (2006.01)

(52) U.S. Cl.
CPC ..... *G06K 9/00362* (2013.01); *G06K 9/00013* (2013.01); *G06K 9/00255* (2013.01); *G06K 9/00355* (2013.01); *G06K 9/00912* (2013.01); *G06K 9/46* (2013.01); *G06K 2009/00932* (2013.01)

(58) Field of Classification Search
CPC .......... G06K 9/00362–00389; G06K 9/00013; G06K 9/00255; G06K 9/00912; G06K 9/46; G06K 9/00221–00295; G06K 2009/00932
See application file for complete search history.

(56) References Cited

U.S. PATENT DOCUMENTS

| 10,452,897 | B1* | 10/2019 | Benkreira | G06K 9/00288 |
| 2009/0060293 | A1* | 3/2009 | Nagao | G06K 9/00221 |
| | | | | 382/118 |
| 2015/0186710 | A1 | 7/2015 | Ahn et al. | |

FOREIGN PATENT DOCUMENTS

| KR | 10-2015-0018349 | 2/2015 |
| KR | 10-2015-0080736 | 7/2015 |

OTHER PUBLICATIONS

Korean Intellectual Property Office Application No. 10-2019-0089157, Office Action dated Jan. 27, 2021, 4 pages.

* cited by examiner

*Primary Examiner* — Sean T Motsinger
(74) *Attorney, Agent, or Firm* — Lee, Hong, Degerman, Kang & Waimey

(57) ABSTRACT

An artificial intelligence apparatus for recognizing a user includes a camera, and a process configured to receive, via the camera, image data including a recognition target object, generate recognition information corresponding to the recognition target object from the received image data, calculate a confidence level of the generated recognition information, determine whether the calculated confidence level is greater than a reference value, if the calculated confidence level is greater than the reference value, perform a control corresponding to the generated recognition information, and if the calculated confidence level is not greater than the reference value, provide a feedback for the object recognition.

11 Claims, 20 Drawing Sheets

FIG. 6
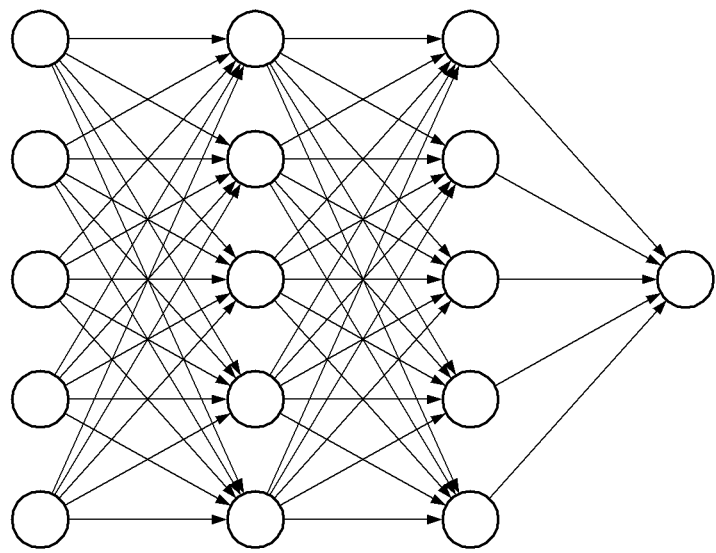
(a)
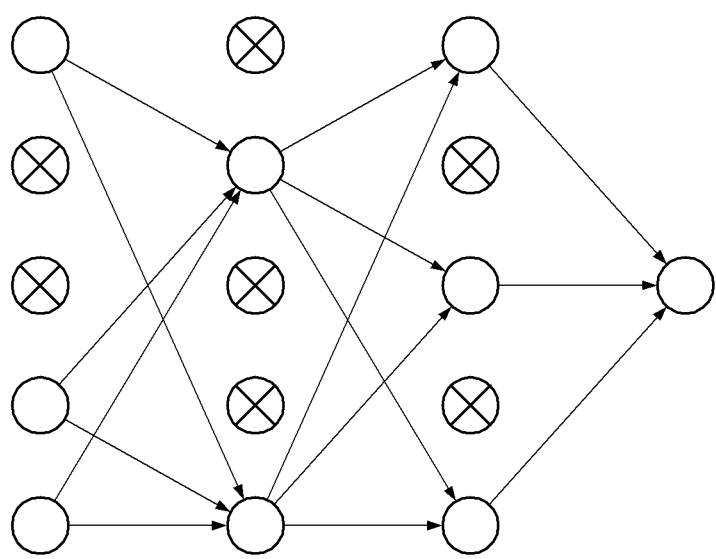
(b)

FIG. 12

| Focus operator | Abbr. | Focus operator | Abbr. |
|---|---|---|---|
| Gradient energy | GRA2 | Gray-level variance | STA3 |
| Gaussian derivative | GRA1 | Gray-level local variance | STA4 |
| Thresholded absolute gradient | GRA3 | Normalized gray-level variance | STA5 |
| Squared gradient | GRA4 | Modifiedgray-level variance | STA6 |
| 3D gradient | GRA5 | Histogram entropy | STA7 |
| Tenengrad | GRA6 | Histogram range | STA8 |
| Tenengrad variance | GRA7 | DCT energy ratio | DCT1 |
| Energy of Laplacian | LAP1 | DCT reduced energy ratio | DCT2 |
| Modified Laplacian | LAP2 | Modified DCT | DCT3 |
| Diagonal Laplacian | LAP3 | Absolute central moment | MIS1 |
| Variance of Laplacian | LAP4 | Brenner's measure | MIS2 |
| Laplacian in 3D window | LAP5 | Image contrast | MIS3 |
| Sum of wavelet coefficients | WAV1 | Image curvature | MIS4 |
| Variance of wavelet coefficients | WAV2 | Hemli and Scherer's mean | MIS5 |
| Ratio of the wavelet coefficients | WAV3 | Local Binary Patterns-based | MIS6 |
| Ratio of curvelet coefficients | WAV4 | Steerable filters-based | MIS7 |
| Chebyshev moments-based | STA1 | Spatial frequency measure | MIS8 |
| Eigenvalues-based | STA2 | Vollath's autocorrelation | MIS9 |

ARTIFICIAL INTELLIGENCE APPARATUS FOR RECOGNIZING USER FROM IMAGE DATA AND METHOD FOR THE SAME

CROSS-REFERENCE TO RELATED APPLICATIONS

Pursuant to 35 U.S.C. § 119(a), this application claims the benefit of earlier filing date and right of priority to Korean Patent Application No. 10-2019-0089157, filed on Jul. 23, 2019, the contents of which are hereby incorporated by reference herein in its entirety.

BACKGROUND

The present invention relates to an artificial intelligence apparatus for recognizing a user from image data and a method for the same. Specifically, the present invention relates to an artificial intelligence apparatus for recognizing a user or an action of a user from image data, and if a confidence level when the user or the action of the user is recognized is not sufficient, finding a factor hindering the recognition confidence level, and provide a feedback, and a method for the same.

Recently, devices that perform a control by receiving a video or a sound to are increasing. Autonomous vehicles recognize and analyze input data and control a movement appropriate to a situation. Smartphones or security devices receive video or sound to determine whether a user is a registered user. Devices having a speech recognition function recognize and analyze speech and perform a control appropriate to intention of the speech.

However, current devices that perform a control by receiving a video or a sound cannot determine whether input data is accurately recognized. If the recognition fails, the current devices merely provide a feedback indicating that the recognition failed (for example, "Please input again"), and does not perform a control to increase the confidence level of the recognition.

Therefore, there is a need for a technology capable of analyzing factors lowering the recognition confidence level of input data and performing a control to increase the recognition confidence level, thereby effectively improving recognition performance of subsequently input data.

SUMMARY

The present invention provides an artificial intelligence apparatus for attempting to recognize an object if image data including a part of a body of a user as a recognition target object is input, performing a control corresponding to the recognized result if the object is well recognized, and providing a feedback if the object is not well recognized, and a method for the same.

The present invention also provides an artificial intelligence apparatus for providing a feedback related to a cause lowering the confidence level of object recognition or a method for increasing the confidence level of object recognition if the object recognition is not well.

One embodiment of the present invention provides an artificial intelligence apparatus and a method for the same. When image data including a recognition target object is received, the artificial intelligence apparatus generates recognition information corresponding to the recognition target object from the received image data; calculates a confidence level of the generated recognition information; determines whether the calculated confidence level is greater than a reference value; if the calculated confidence level is greater than the reference value, performs a control corresponding to the generated recognition information; and if the calculated confidence level is not greater than the reference value, provides a feedback for the object recognition.

In addition, one embodiment of the present invention provides an artificial intelligence apparatus and a method for the same. When it is determined that object recognition is not well performed, the artificial intelligence apparatus extracts image features influencing the confidence level of the object recognition from the image data; determines abnormal features lowering the confidence level of the recognition among the extracted image features; generates a feedback based on the determined abnormal feature; and provides the generated feedback, and a method for the same.

The details of one or more embodiments are set forth in the accompanying drawings and the description below. Other features will be apparent from the description and drawings, and from the claims.

BRIEF DESCRIPTION OF THE DRAWINGS

FIG. 6 is a view illustrating a dropout technique in an artificial neural network.

FIG. 12 is a view illustrating an example of image features included in an image feature set according to an embodiment of the present invention.

DETAILED DESCRIPTION OF THE EMBODIMENTS

Figure 1:
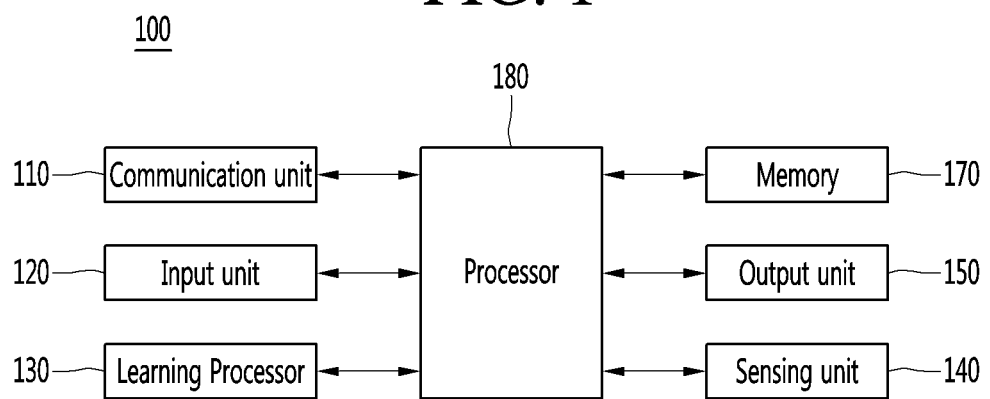
FIG. 1 is a block diagram illustrating an AI apparatus according to an embodiment of the present invention.

Hereinafter, embodiments of the present invention are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present invention is not limited thereto. It should be understood that all of variations, equivalents or substitutes contained in the concept and technical scope of the present invention are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for training data is given, and the label may mean the correct answer (or result value) that the artificial neural network must infer when the training data is input to the artificial neural network. The unsupervised learning may refer to a method of learning an artificial neural network in a state in which a label for training data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

Here, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 is a block diagram illustrating an AI apparatus 100 according to an embodiment of the present invention.

The AI apparatus (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication unit 110, an input unit 120, a learning processor 130, a sensing unit 140, an output unit 150, a memory 170, and a processor 180.

The communication unit 110 may transmit and receive data to and from external devices such as other AI apparatuses 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

Here, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a training data for model learning and an input data to be used when an output is acquired by using learning model. The input unit 120 may acquire raw input data. Here, the processor 180 or the learning processor 130 may extract an input feature by preprocessing the input data.

The learning processor 130 may learn a model composed of an artificial neural network by using training data. The learned artificial neural network may be referred to as a learning model. The learning model may be used to an infer result value for new input data rather than training data, and the inferred value may be used as a basis for determination to perform a certain operation.

Here, the learning processor 130 may perform AI processing together with the learning processor 240 of the AI server 200.

Here, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensing unit 140 may acquire at least one of internal information about the AI apparatus 100, ambient environment information about the AI apparatus 100, or user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

Here, the output unit 150 may include a display unit for outputting time information, a speaker for outputting auditory information, and a haptic module for outputting haptic information.

The memory 170 may store data that supports various functions of the AI apparatus 100. For example, the memory 170 may store input data acquired by the input unit 120, training data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
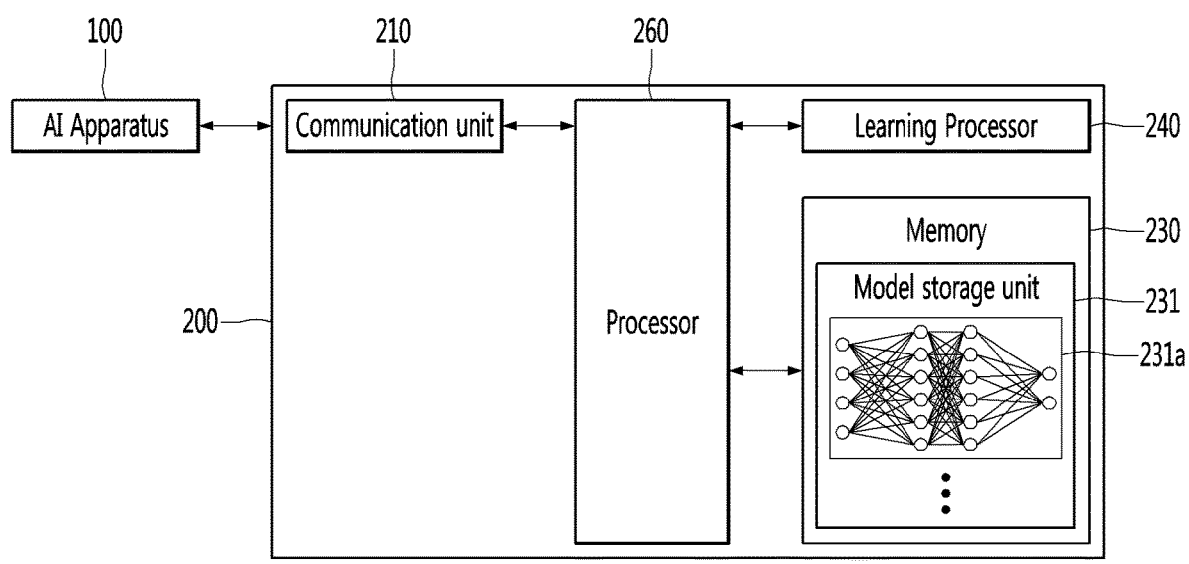
FIG. 2 is a block diagram illustrating an AI server according to an embodiment of the present invention.

FIG. 2 is a block diagram illustrating an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. Here, the AI server 200 may be included as a partial configuration of the AI apparatus 100, and may perform at least part of the AI processing together.

The AI server 200 may include a communication unit 210, a memory 230, a learning processor 240, a processor 260, and the like.

The communication unit 210 can transmit and receive data to and from an external device such as the AI apparatus 100.

The memory 230 may include a model storage unit 231. The model storage unit 231 may store a learning or learned model (or an artificial neural network 231a) through the learning processor 240.

The learning processor 240 may learn the artificial neural network 231a by using the training data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
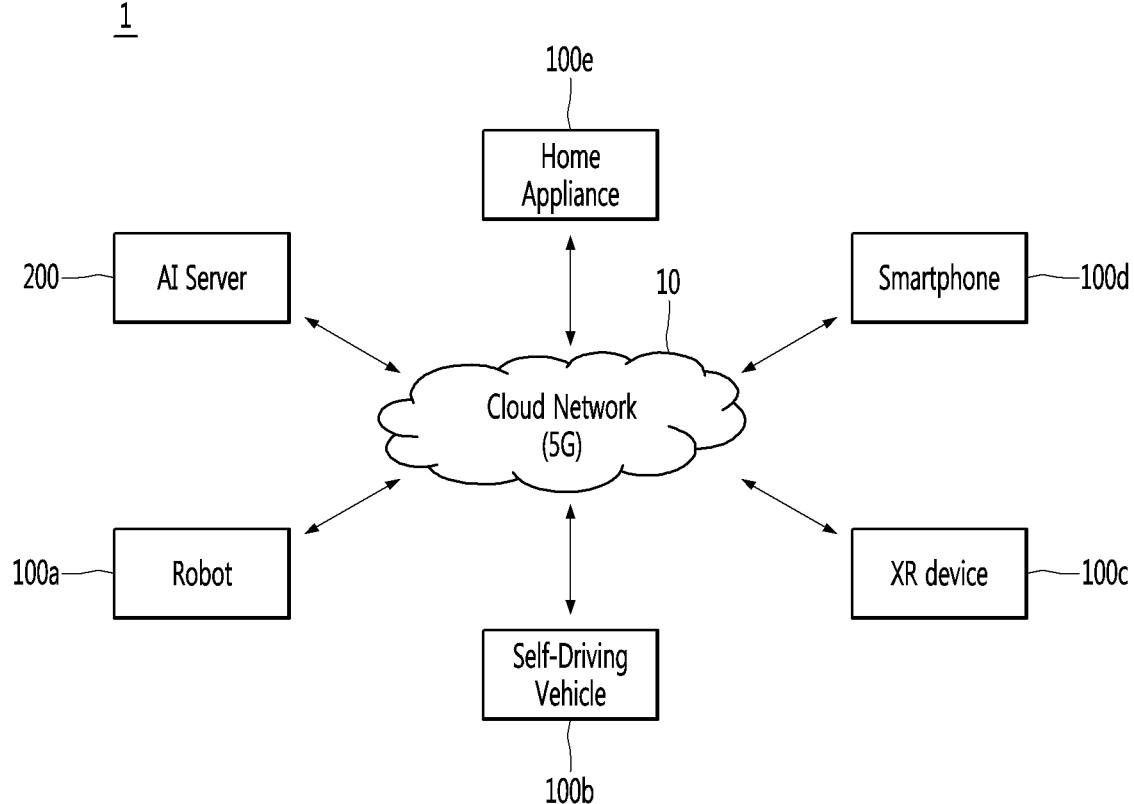
FIG. 3 is a view illustrating an AI system according to an embodiment of the present invention.

FIG. 3 is a view illustrating an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI apparatuses 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100a, the self-driving vehicle 100b, the XR device 100c, the smartphone 100d, or the home appliance 100e through the cloud network 10, and may assist at least part of AI processing of the connected AI apparatuses 100a to 100e.

Here, the AI server 200 may learn the artificial neural network according to the machine learning algorithm instead of the AI apparatuses 100a to 100e, and may directly store the learning model or transmit the learning model to the AI apparatuses 100a to 100e.

Here, the AI server 200 may receive input data from the AI apparatuses 100a to 100e, may infer the result value for the received input data by using the learning model, may generate a response or a control command based on the inferred result value, and may transmit the response or the control command to the AI apparatuses 100a to 100e.

Alternatively, the AI apparatuses 100a to 100e may infer the result value for the input data by directly using the learning model, and may generate the response or the control command based on the inference result.

Hereinafter, various embodiments of the AI apparatuses 100a to 100e to which the above-described technology is applied will be described. The AI apparatuses 100a to 100e illustrated in FIG. 3 may be regarded as a specific embodiment of the AI apparatus 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

Here, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external device to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. Here, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, or the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

Here, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external device to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. Here, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

Here, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

Here, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. Here, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

Here, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
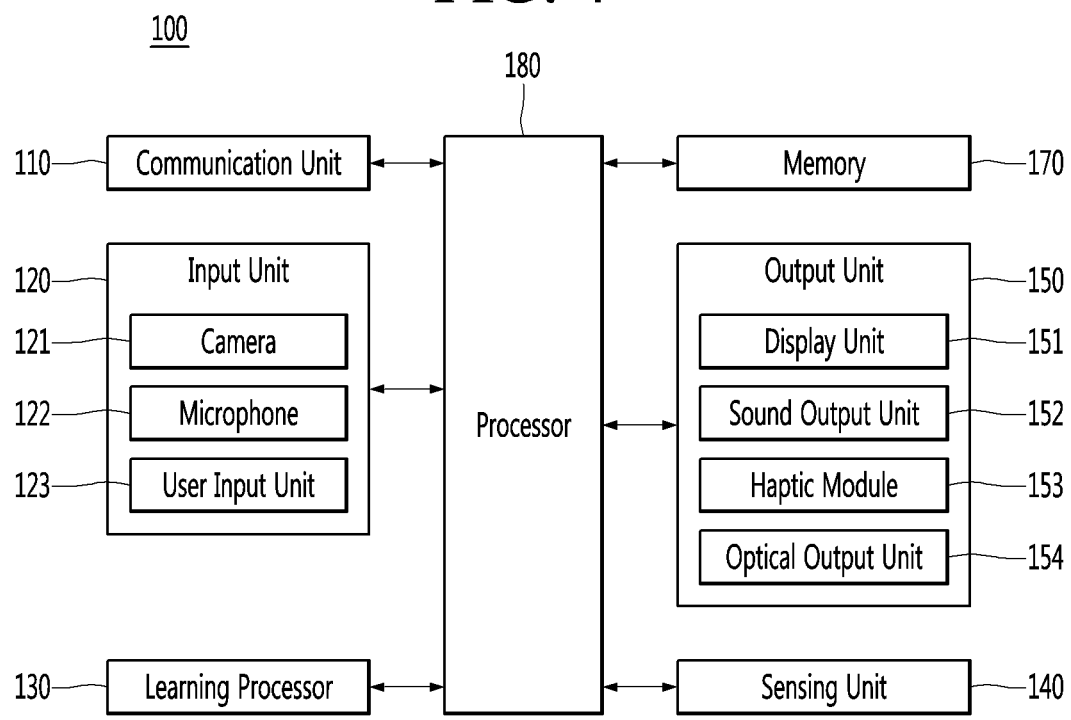
FIG. 4 is a block diagram illustrating an AI apparatuses according to an embodiment of the present invention.

FIG. 4 is a block diagram illustrating an AI apparatus according to an embodiment of the present invention.

The redundant repeat of FIG. 1 will be omitted below.

Referring to FIG. 4, the input unit 120 may include a camera 121 for image signal input, a microphone 122 for receiving audio signal input, and a user input unit 123 for receiving information from a user.

Voice data or image data collected by the input unit 120 are analyzed and processed as a user's control command.

Then, the input unit 120 is used for inputting image information (or signal), audio information (or signal), data, or information inputted from a user and the AI apparatus 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the AI apparatus 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the AI apparatus 100 to correspond to the inputted information.

The user input unit 123 may include a mechanical input means (or a mechanical key, for example, a button, a dome switch, a jog wheel, and a jog switch at the front, back or side of the AI apparatus 100) and a touch type input means. As one example, a touch type input means may include a virtual key, a soft key, or a visual key, which is displayed on a touch screen through software processing or may include a touch key disposed at a portion other than the touch screen.

A sensing unit 140 may be called a sensor unit.

The output unit 150 may include at least one of a display unit 151, a sound output module 152, a haptic module 153, or an optical output module 154.

The display unit 151 may display (output) information processed in the AI apparatus 100. For example, the display unit 151 may display execution screen information of an application program running on the AI apparatus 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the AI apparatus 100 and a user, and an output interface between the AI apparatus 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the AI apparatus 100. An example of an event occurring in the AI apparatus 100 includes message reception, call signal reception, missed calls, alarm, schedule notification, e-mail reception, and information reception through an application.

In addition, the optical output unit 154 may include an infrared light source and may emit infrared light. The infrared light emitted from the optical output unit 154 may be reflected from the body of the user or transmitted through the body of the user, the camera 121 may acquire an infrared image of the body of the user' irradiated with the infrared light, and the acquired infrared image may be used to recognize the vein of the user.

Figure 5:
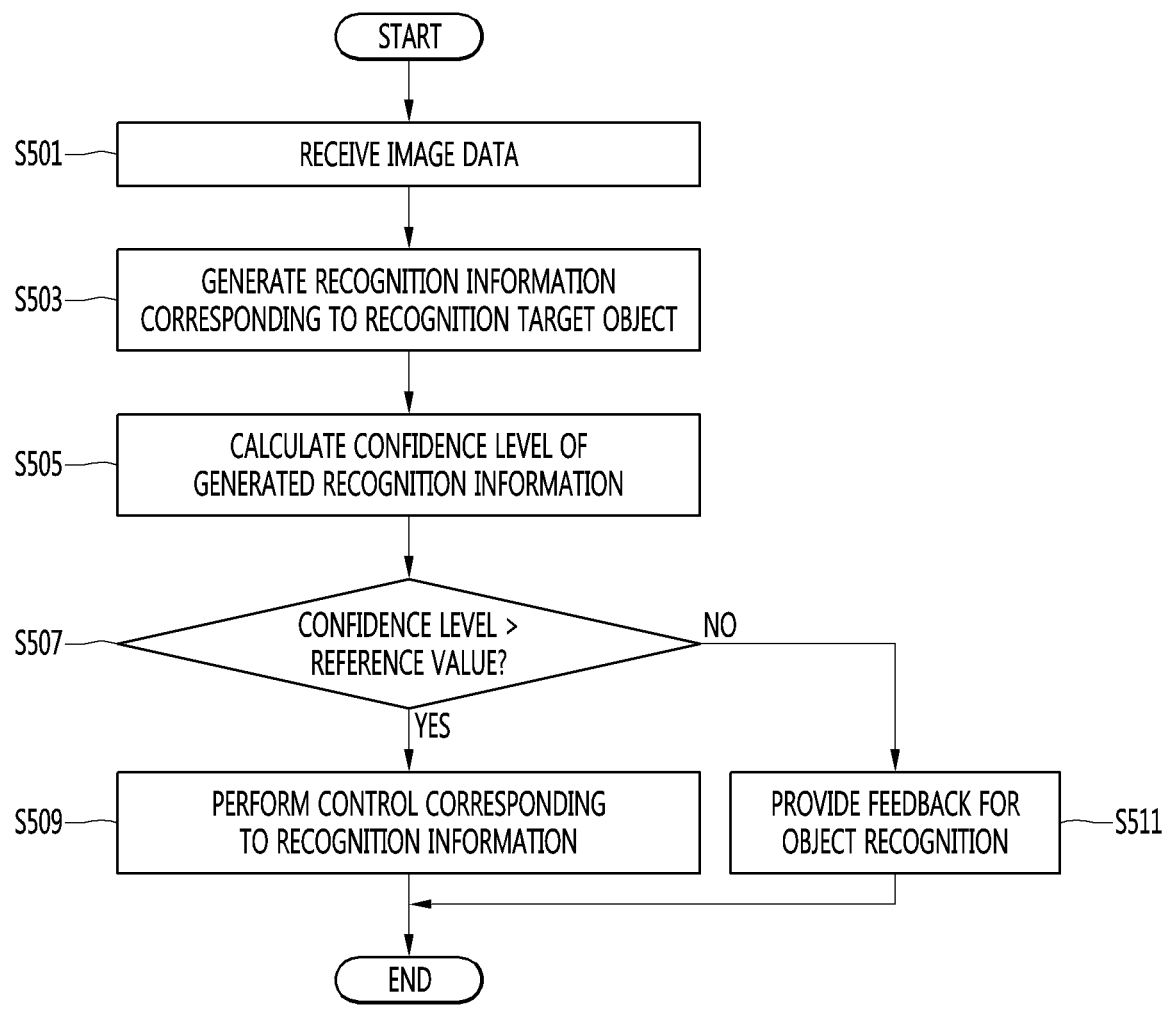
FIG. 5 is a flowchart illustrating a method for recognizing a user according to an embodiment of the present invention.

FIG. 5 is a flowchart illustrating a method for recognizing a user according to an embodiment of the present invention.

Referring to FIG. 5, the processor 180 of the AI apparatus 100 receives image data (S501).

The image data may include at least a part of the body of the user to be recognized.

For example, the image data for the user may include at least one of a user's face, a user's finger, a user's hand, the back of a user's hand, a user's eye, and these may all be the object to be recognized in the AI apparatus 100.

Hereinafter, the object to be recognized may be referred to as a recognition target object or a target object.

The processor 180 may receive image data photographed by the camera 121, or may receive image data photographed by an external device (not shown) through the communication unit 110.

The image data may include at least one of RGB image data, IR image data, or depth image data. The RGB image data may refer to image data including RGB information, the IR image data may refer to image data including IR information, and the depth image data may refer to image data including depth information.

That is, the camera 121 or the camera of the external device (not shown) used to acquire image data may include at least one of an RGB sensor, an IR sensor, or a depth sensor.

An example of the camera having the depth sensor is a time of flight (ToF) camera.

The processor 180 of the AI apparatus 100 generates recognition information corresponding to the recognition target object from the image data (S503).

Generating the recognition information corresponding to the recognition target object may mean recognizing the existence and characteristics of the recognition target object from the image data.

Here, the recognition information may include identification information for specifying the recognition target object.

For example, the recognition information may include, as identification information, face identification information of the user, fingerprint identification information of the user, vein pattern identification information of the user, and iris identification information of the user, which identify the user.

Here, the identification information may include at least one of a type, a size, a color, a position, or an area within image data of the recognition target object.

The processor 180 may generate the identification information by identifying only a predetermined recognition target object from the image data according to a predetermined identification function, or may generate the identification information by identifying a plurality of recognition target objects recognizable from the image data. For example, if only a user facial recognition function is used, the processor 180 may determine whether the face of the user exists from the image data, identify the face of the user if the face of the user exists, and generate identification information corresponding to the identified object. Meanwhile, if the processor 180 performs recognition in a state in which a separate recognition target object is not set, the processor 180 may determine whether objects recognizable from the image data, such as a user's face, a user's hand, a user's finger, the back of a user's hand, etc., exist, identify the existing recognition target objects, and generate identification information corresponding to the identified objects.

Generating the recognition information includes an attempt to recognize or identify the recognition target object. Therefore, the processor 180 may attempt to recognize the recognition target object from the image data so as to generate the recognition information, and may fail to generate the recognition information when the recognition fails.

Furthermore, the recognition information may further include action information indicating the action of the recognition target object.

The action information may include continuous motion information of the recognition target object for a predetermined time, attitude information of the recognition target object at one time, and the like.

For example, the recognition information may include facial expression information, gesture information, pose information, and the like as action information.

The facial expression information is information representing the facial expression of the user's face and may include a smiling face, a crying face, an angry face, and the like.

The gesture information is information representing a time series action of a user's hand or finger, and may include a swipe, flick, tap, pinch in/out, and the like.

The pose information is information representing a shape or a posture of a user's hand or finger, and may include a thumb up, a V, an OK, and the like.

If the recognition target object does not exist in the image data or the image data includes a lot of noise and thus the recognition of the recognition target object fails, the processor 180 may generate the recognition result that the recognition information is not generated and the generation of the recognition information fails.

Here, the AI apparatus 100 may generate at least one of identification information or action information corresponding to the recognition target object using the object recognition model.

The object recognition model may be a recognition model learned using a machine learning algorithm or a deep learning algorithm and may be configured as an artificial neural network.

Here, the object recognition model may be learned by the learning processor 130 of the AI device 100 or may be learned by the learning processor 240 of the AI server 200.

Here, the object recognition model may be stored in the memory 170 of the AI apparatus 100 or may be stored in the memory 230 of the AI server 200.

If the object recognition model is stored in the memory 230 of the AI server 200, the processor 180 of the AI apparatus 100 may receive an object recognition model through the communication unit 110 and generate recognition information by directly recognizing an object from image data using the received object recognition model, and may transmit the image data to the AI server 200 through the communication unit 110 and receive the recognition information generated using the object recognition model from the AI server 200.

The processor 180 of the AI apparatus 100 calculates a confidence level of the recognition information (S505).

Calculating the confidence level of the recognition information may mean measuring an uncertainty of the generated recognition information.

For example, when a face of a first user is included in the image data but an afterimage is slightly present, the processor 180 may generate recognition information including identification information corresponding to the face of the first user with a confidence level of 80%.

Here, the confidence level of the recognition information may be expressed as a numerical value within a continuous range of [0, 1] or [0%, 100%].

The confidence level or uncertainty may be used as an indicator to determine whether the recognition information generated by the object recognition model is reliable.

Here, the processor 180 may measure the confidence level or uncertainty by using a dropout technique with respect to the object recognition model composed of artificial neural networks.

Here, the processor 180 may measure the confidence level or uncertainty through perturbation with respect to the image data.

Here, the processor 180 may extract a heatmap corresponding to the recognition information from the image data based on Class Activation Mapping (CAM) and calculate the confidence level or accuracy of the recognition information in the extracted heatmap to thereby measure the confidence level or uncertainty of the recognition information.

The processor 180 of the AI apparatus 100 determines whether the calculated confidence level exceeds a reference value (S507).

If the first confidence level exceeds the reference value, it may mean that the recognition information is generated with a satisfactory confidence level, and this may mean that the recognition of the object has been successfully performed.

The reference value may be determined by the user's setting or may be a predetermined value.

Here, the processor 180 may change the reference value in consideration of user feedback.

For example, if the calculated confidence level exceeds the reference value, the processor 180 determines that the object is successfully recognized from the image data, but if the user provides a feedback indicating that the object has been inaccurately recognized, the processor 180 may adjust the reference value upward.

However, adjustment of the reference value based on the feedback should be done carefully and conservatively.

When it is determined in operation S507 that the calculated confidence level exceeds the reference value, the processor 180 of the AI apparatus 100 performs a control corresponding to the recognition information (S509).

Since the calculated confidence level has exceeded the reference value, the processor 180 may determine the generated recognition information as the recognition information generated by successfully recognizing the object. Therefore, the processor 180 performs a control corresponding to the generated recognition information.

If the object recognition is object recognition for security authentication, the processor 180 may determine whether the authentication is successful by comparing the generated recognition information with pre-registered recognition information (or security information) that can pass the security authentication. The processor 180 may output a notification indicating whether the security authentication is successful as an image through the display unit 151 or as a sound through the sound output unit 152.

The object recognition for security authentication may include a user's facial recognition, a user's iris recognition, a user's vein pattern recognition, and the like.

If the object recognition is object recognition for gesture recognition, the processor 180 may determine whether the gesture recognition is successful by comparing the generated recognition information with pre-registered recognition information (or gesture information) about gestures that can be recognized. The processor 180 may perform a control corresponding to a gesture whose recognition is successful.

The gesture to be recognized may include not only dynamic movement of a part of the body of the user but also a static shape or posture of a part of the body of the user.

For example, if the recognized gesture is an action of swiping a finger upward, the processor 180 may scroll and output a screen being output from the display unit 151 downward.

When it is determined in operation S507 that the calculated confidence level does not exceed the reference value, the processor 180 of the AI apparatus 100 provides a feedback for object recognition (S511).

The feedback for the object recognition may be generated based on at least one of the confidence level or the recognition result.

The feedback for object recognition includes at least one of a feedback indicating a factor lowering the confidence level, a feedback indicating a factor lowering the confidence level and suggesting improvement of the factor, or a feedback indicating a result of recognizing a part of image data whose object recognition has been successful.

For example, the feedback indicating the factor lowering the confidence level may indicate a feedback indicating that brightness is too high and the recognition is not well performed, a feedback indicating that a blur level is low and the recognition is not well performed, a feedback indicating that an object size is too small and the recognition is not well performed, a feedback indicating that an entire recognition target object is not included in the image data and the recognition is not well performed, and the like.

For example, the feedback indicating the factor lowering the confidence level and suggesting the improvement of the factor may include a feedback suggesting that the recognition should be attempted in a slightly darker environment because the brightness is too high and the recognition is not well performed, a feedback suggesting that the recognition should be attempted by reducing the movement because the blur level is low and the recognition is not well performed.

The feedback provided by the processor 180 may be output as image information through the display unit 151, and may be output as a sound through the sound output unit 152. In addition, the feedback may be output from an external device through the wireless communication unit 110.

FIG. 6 is a view illustrating a dropout technique in an artificial neural network.

As illustrated in FIG. 6, the dropout technique is a technique used to prevent overfitting of an artificial neural network. The dropout technique may mean determining a result in a state in which nodes constituting the artificial neural network are arbitrarily excluded.

FIG. 6(*a*) illustrates an example of an object recognition model composed of all-connected artificial neural networks, and all nodes are connected.

FIG. 6(*b*) illustrates a state in which arbitrary nodes are excluded by using the dropout technique with respect to the artificial neural network model of FIG. 6(*a*).

Figure 7:
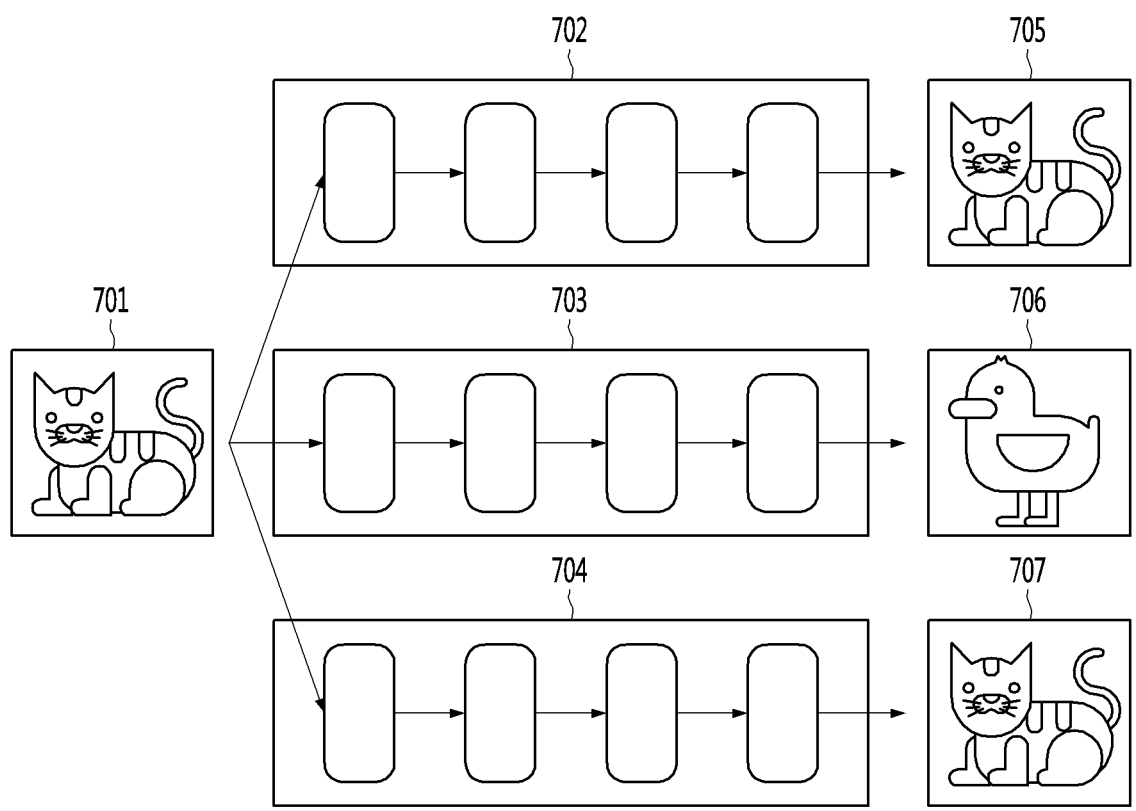
FIG. 7 is a view illustrating a method for measuring a confidence level of recognition information using a dropout technique according to an embodiment of the present invention.

FIG. 7 is a view illustrating a method for measuring the confidence level of recognition information using a dropout technique according to an embodiment of the present invention.

Referring to FIG. 7, according to an embodiment of the present invention, when image data 701 for object recognition is input, the processor 180 may generate a plurality of dropped-out object recognition models 702, 703, and 704 using the dropout technique, and generate dropout-based recognition information 705, 706, and 707 for the image data 701 using each of the dropped-out object recognition models 702, 703, and 704.

The processor 180 may determine the confidence level of the recognition information generated by the object recognition model using the number of dropout-based recognition information that is the same as the recognition information generated by the object recognition model among the generated dropout-based recognition information 705, 706, and 707.

For example, it is assumed that the image data 701 is an image including a cat, and the object recognition model has generated recognition information that an object included in the image data 701 is a cat. It is assumed that when the dropout-based recognition information 705, 706, and 707 is generated using three dropped-out object recognition models 702, 703, and 704, two pieces of dropout-based recognition information 705 and 707 indicate the cat that is the same as the recognition information generated by the object recognition model. Here, the processor 180 may determine that the confidence level of the recognition information generated by the object recognition model is 66%.

In FIG. 7, only three dropped-out object recognition models are presented, but this is merely an example. That is, the confidence level of the recognition information generated by the object recognition model may be measured (determined) using a larger number (for example, 100) of dropped-output object recognition models.

In a case where the dropout-based recognition information is generated using 100 dropped-out object recognition models, if 80 pieces of dropout-based recognition information are the same as the recognition information generated using the object recognition model, the processor 180 may determine that the confidence level of the generated recognition information is 80%.

Here, the processor 180 may determine the confidence level of the recognition information generated using at least one of an average or a variance of the number of dropout-based recognition information that is the same as the recognition information generated using the object recognition model among the entire pieces of dropout-based recognition information.

Figure 8:
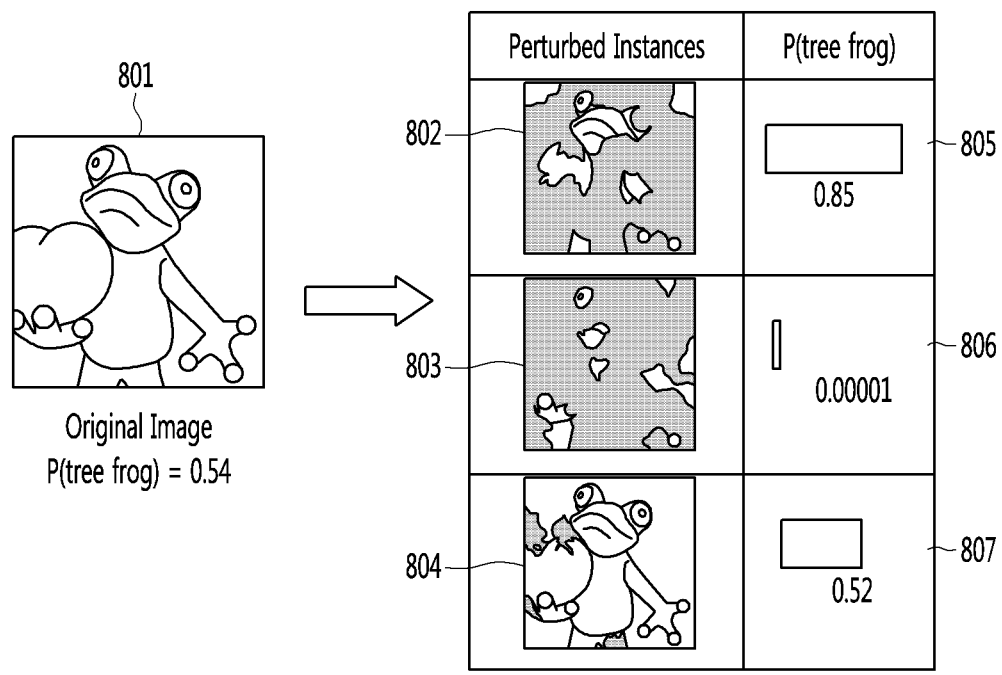
FIG. 8 is a view illustrating a method for measuring a confidence level of recognition information through perturbation with respect to image data according to an embodiment of the present invention.

FIG. 8 is a view illustrating a method for measuring a confidence level of recognition information through perturbation with respect to image data according to an embodiment of the present invention.

Referring to FIG. 8, according to an embodiment of the present invention, when an image 801 for object recognition is input, the processor 180 may generate image data 802, 803, and 804 changed using random noise with respect to the image data, and generate change-based recognition information 805, 806, and 807 for each of the generated changed image data 802, 803, and 804 using the object recognition model.

The processor 180 may determine the confidence level of the recognition information generated by the object recognition model using the number of change-based recognition information that is the same as the recognition information generated by the object recognition model among the entire pieces of generated variation-based recognition information 805, 806, and 807.

For example, it is assumed that the image data 801 is an image including a tree frog, and the object recognition model determines that the probability that the object included in the image data 801 is a tree frog and generates recognition information that the object included in the image data 801 is a tree frog. It is assumed that the change-based recognition information 805, 806, and 807 is generated using the object recognition model for the three changed image data 802, 803, and 804, the two pieces of change-based recognition information 805 and 807 indicate the tree frog with a probability of 50% or more, equally to the recognition information generated for the image data 801. In this case, the processor 170 may determine that the confidence level of the recognition information generated by the object recognition model is 66%.

In FIG. 8, only three changed image data are presented, but this is merely an example. That is, the confidence level of the recognition information generated by the object recognition model may be measured (determined) using a larger number (for example, 100) of changed image data.

In a case where the change-based recognition information is generated using 100 changed image data, if 80 pieces of change-based recognition information are the same as the recognition information for the image data, the processor 180 may determine that the confidence level of the generated recognition information is 80%.

Here, the processor 180 may determine the confidence level of the recognition information generated using at least one of an average or a variance of the number of change-based recognition information that is the same as the recognition information for the image data among the entire pieces of change-based recognition information.

Figure 9:
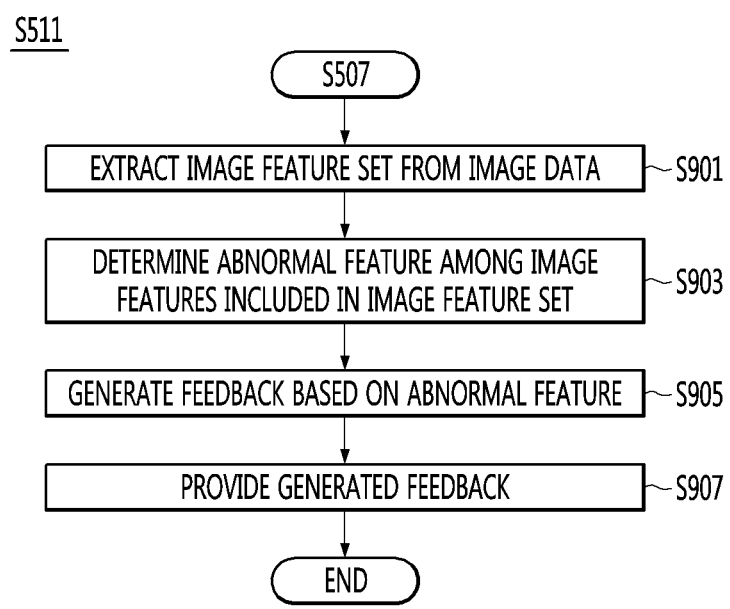
FIG. 9 is a flowchart illustrating an example of providing a feedback for object recognition illustrated in FIG. 3 (S511).

FIG. 9 is a flowchart illustrating an example of providing a feedback for object recognition illustrated in FIG. 3 (S511).

Referring to FIG. 9, the processor 180 extracts an image feature set from the acquired image data (S901).

The image feature set may include at least one image feature representing a feature that affects the recognition confidence level of the acquired image data.

Here, the image feature set is an image feature that affects the confidence level of image recognition, and may include at least one of brightness, saturation, illuminance, hue, noise level, blur level, frequency-based feature, energy level or depth, object area, or object position.

Here, the frequency-based feature may include at least one of an edge, a shape, or a texture.

Here, the frequency-based feature may be acquired from the image data through Fourier transform, the edge and the shape may be acquired in a high frequency region, and the texture may be acquired in a low frequency region.

Here, the frequency-based feature may be extracted using an image pyramid network.

The processor 180 of the AI apparatus 100 determines at least one of the image features included in the extracted image feature set as an abnormal feature (S903).

The abnormal feature may refer to a feature lowering the confidence level of image recognition among image features included in the image feature set. Meanwhile, image features that are not determined as the abnormal feature among the image features included in the image feature set may be referred to as normal features.

The processor 180 may determine the abnormal feature among the image features included in the image feature set by using an abnormal feature determination model.

The abnormal feature determination model may be learned using training image data to which whether object recognition is successful is labeled.

Specifically, by extracting the image feature set from the training image data, a correspondence relationship between the image feature set corresponding to each training image data and object recognition success or failure may be acquired. The abnormal feature determination model may be learned using a plurality of image feature sets and the object recognition success or failure corresponding thereto.

The abnormal feature determination model may include range information or critical point information for determining whether the object recognition is successful for each image feature constituting the image feature set.

In the abnormal feature determination model, the range information for determining whether the object recognition is successful may mean information about an abnormal range and a normal range.

In the abnormal feature determination model, the critical point information may mean information a threshold that distinguishes the abnormal range from the normal range.

The abnormal range may mean a range of each image feature in which the object recognition in the image data fails.

The normal range is a concept opposite to the abnormal range, and may mean a range of image features in which the object recognition is successful.

Here, the abnormal feature determination model may determine ranking information for each abnormal feature, and each abnormal feature may have a higher ranking as the influence on the confidence level of the object recognition increases.

The abnormal feature point determination model may include one or more normal ranges or abnormal ranges for each image feature constituting the image feature set. That is, even one image feature may have one or more normal ranges or abnormal ranges.

For example, there may be a first normal range, . . . , an nth normal range or a first abnormal range, . . . and an mth abnormal range for one image feature.

The abnormal feature determination model may include ranking information for each normal range or each abnormal range, and each normal range or each abnormal range may have a higher ranking as the influence on the confidence level of the object recognition increases.

For example, it is assumed that the influence on the confidence level of the object recognition increases in the order of the first normal range for the brightness, the first normal range for the blur level, and the second normal range for the brightness. In this case, the first normal range for the brightness may be set to the first priority, the first normal range for the blur level may be set to the second priority, and the second normal range for the brightness may be set to the third priority.

The abnormal feature determination model may include an artificial neural network and may be trained using a machine learning algorithm or a deep learning algorithm, or may include a decision tree and may be learned using a decision tree learning method.

The processor 180 may acquire abnormal range information or normal range information for each image feature constituting the image feature set from the abnormal feature determination model, and may determine, as the abnormal feature, an image feature belonging to a corresponding abnormal range among the image features included in the image feature set.

On the contrary, the processor 180 may acquire abnormal range information for each image feature constituting the image feature set from the abnormal feature determination model, and may determine, as the abnormal feature, an image feature not belonging to a corresponding normal range among the image features included in the image feature set.

Here, the normal range and the abnormal range may be independently determined for each image feature, but the normal range and the abnormal range of the plurality of image features may be determined depending on each other.

For example, the normal range and the abnormal range of the brightness among the image features may be set dependently based on the saturation as another image feature.

Furthermore, the processor 180 may calculate an abnormality degree based on the degree of deviation from the normal range for each abnormal feature using the abnormal feature determination model. Ranking between the abnormal features may be determined in consideration of the abnormality degree, and a feedback may be generated in consideration of the ranking between the abnormal features.

For example, it is assumed that the blur level is very low, which has the greatest influence on the confidence level of the object recognition, and the brightness is very high, which is the second largest influence on the confidence level of the object recognition.

Here, the processor 180 may determine the blur level as the first-priority abnormal feature, and determine the brightness as the second-priority abnormal feature. The processor 180 may generate a feedback including not only information that both the blur level and the brightness are classified into the abnormal features, but also information that the blur level is the abnormal feature having a priority higher than that of the brightness.

The processor 180 may determine the ranking between the abnormal features by comparing the magnitude of the normalized abnormality degree.

For example, it is assumed that the normal range of the first abnormal feature is [0, 10], the normal range of the second abnormal feature is [0, 20], the value of the first abnormal feature is 15, and the value of the second abnormal feature is 25. In this case, the abnormality degrees of the first abnormal feature and the second abnormal feature are all 5. However, if considering the normal range, the normalized abnormality degree of the first abnormal feature is relatively larger than the normalized abnormality degree of the second abnormal feature. Therefore, the processor 180 may determine the first abnormal feature as the first-priority abnormal feature.

When the abnormality degree is normalized, the processor 180 may normalize the abnormality degree based on the normal range, but may normalize the abnormality degree based on the entire range of values the corresponding abnormal feature can have.

The abnormal feature determination model may be learned by the processor 180 of the AI apparatus 100 or the learning processor 240 of the AI server 200.

The abnormal feature determination model may be stored in the memory 170 of the AI apparatus 100 or in the memory 230 of the AI server 200.

If the abnormal feature determination model is stored in the memory 170 of the AI apparatus 100, the processor 180 may determine the abnormal feature using the abnormal feature determination model stored in the memory 170.

If the abnormal feature determination model is stored in the memory 230 of the AI server 200, the processor 180 may receive the abnormal feature determination model from the AI server 200 through the communication unit 110 and determine the abnormal feature using the received abnormal feature determination model.

Alternatively, if the abnormal feature determination model is stored in the memory 230 of the AI server 200, the processor 180 may transmit the image data or the image feature set to the AI server 200 through the communication unit 110, and may receive the abnormal features determined through the abnormal feature determination model from the AI server 200.

Here, when specific image features are determined as the abnormal feature, the processor 180 may generate cause information indicating the reason why the corresponding image features are determined as the abnormal feature.

For example, if the blur level among the image features is determined as the abnormal feature, the processor 180 may generate cause information indicating that the blur level is too low.

For example, if the object area among the image features is determined as the abnormal feature, the processor 180 may generate cause information indicating that the object area is too narrow or too wide.

For example, if the object position among the image features is determined as the abnormal feature, the processor 180 may generate cause information indicating that the object is biased in a specific direction on the image data.

The processor 180 of the AI apparatus 100 generates a feedback based on the abnormal feature (S905).

The feedback may include at least one of contents indicating the abnormal feature or contents suggesting an action for eliminating the abnormal feature.

For example, if the blur level is low and the blur level is classified into the abnormal feature, the processor 180 may generate a feedback including at least one of contents indicating that the blur level is low and the object recognition failed or contents suggesting to reduce the motion so as to increase the blur level.

The feedback may include contents providing object recognition information predicted with respect to the input image data.

Here, the processor 180 may generate a feedback including an example of object recognition information predicted according to incomplete object recognition.

For example, if the object recognition fails because the blur level of the image data is low, but it is determined that there is a possibility that the user's hand is included in the image data, the processor 180 may generate a feedback of contents asking whether the object included in the image data is the hand.

The processor 180 provides the generated feedback (S1407).

The processor 180 may output the feedback generated through the display unit 151 as image information, or may output the feedback generated through the sound output unit 152 as sound information.

Alternatively, the processor 180 may transmit an output signal or a control signal for outputting the feedback generated by the external device through the communication unit 110.

Figure 10:
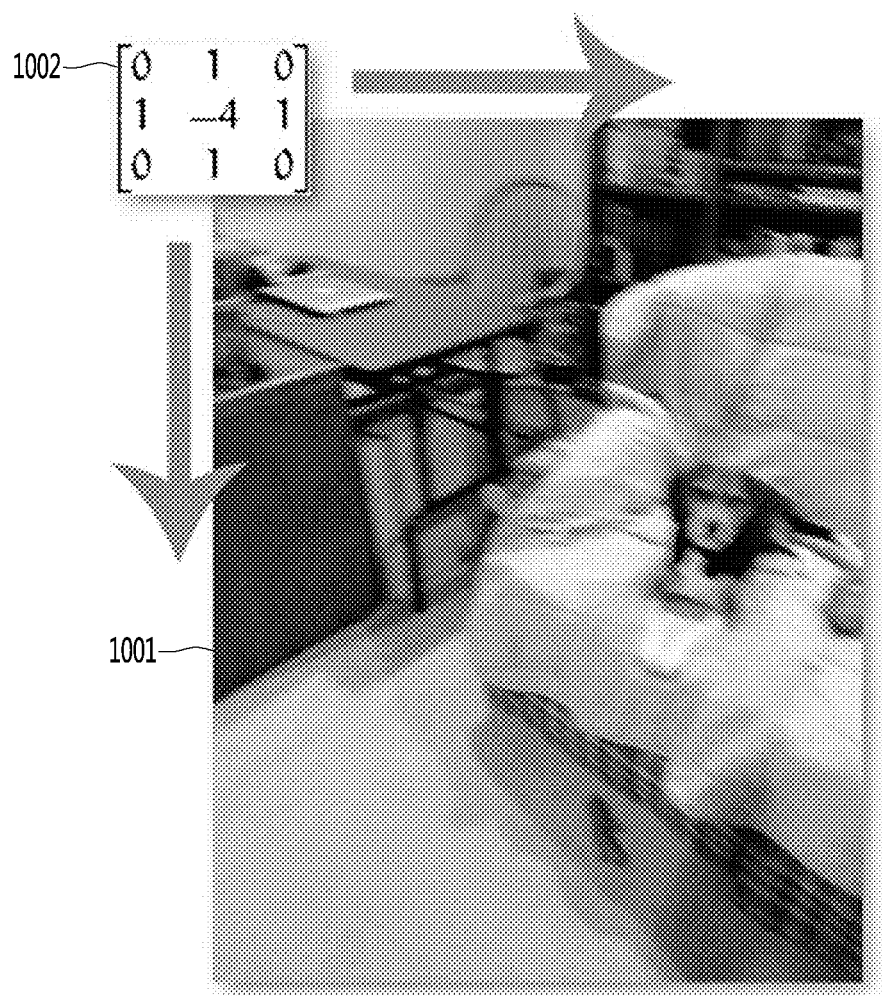
FIGS. 10 and 11 are views illustrating a method for extracting a blur level as an image feature from image data according to an embodiment of the present invention.
Figure 11:
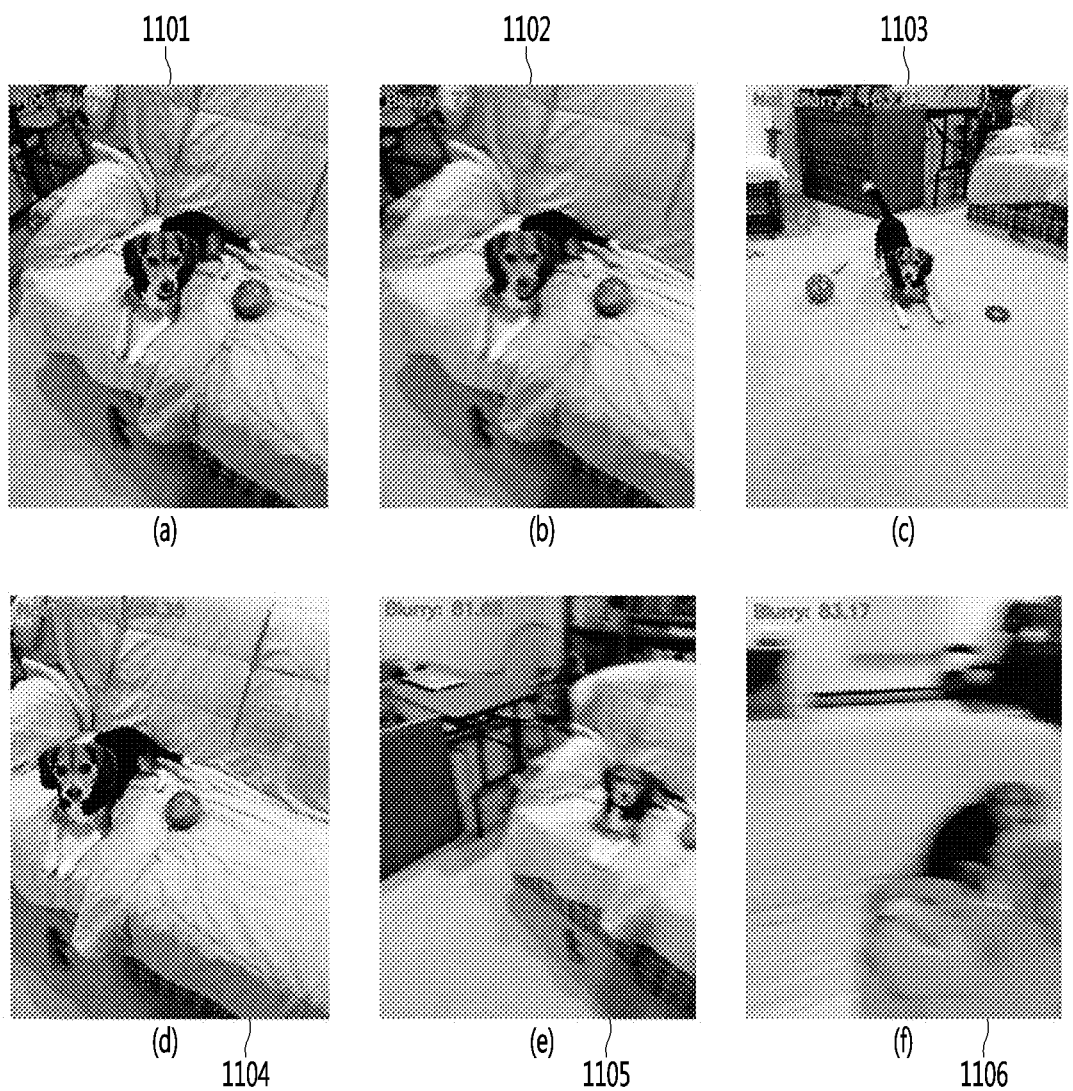

FIGS. 10 and 11 are views illustrating a method for extracting a blur level as an image feature from image data according to an embodiment of the present invention.

Referring to FIG. 10, an embodiment of the present invention is a method for extracting a blur level from image data. The processor 180 may calculate Laplacian using a Laplace kernel 1002 with respect to image data 1001, calculate a variance of Laplacian, and use the variance of Laplacian as a blur level.

As the variance (blur level) of Laplacian is higher, the image data is clearer, and as the variance (blur level) of Laplacian is lower, the image data is more blur.

Here, the processor 180 may determine that it is a clear picture when the blur level is a predetermined level or more.

Referring to FIG. 11, the processor 180 may determine the blur level of the image data 1101 of FIG. 11(a) as 307.45, the blur level of the image data 1102 of FIG. 11(b) as 73.77, the blur level of the image data 1103 of FIG. 11(c) as 463.21, the blur level of the image data 1104 of FIG. 11(d) as 206.35, the blur level of the image data 1105 of FIG. 11(e) as 81.68, and the blur level of the image data 1106 of FIG. 11(f) as 83.17.

FIG. 12 is a view illustrating an example of image features included in an image feature set according to an embodiment of the present invention.

FIG. 12 illustrates an example of image features that can be included in an image feature set according to an embodiment of the present invention, and the image features ma be selectively included in the image feature set.

That is, although all the image features shown in FIG. 12 may be included in the image feature set, all the image features shown in FIG. 12 may not be included in the image feature set.

Figure 13:
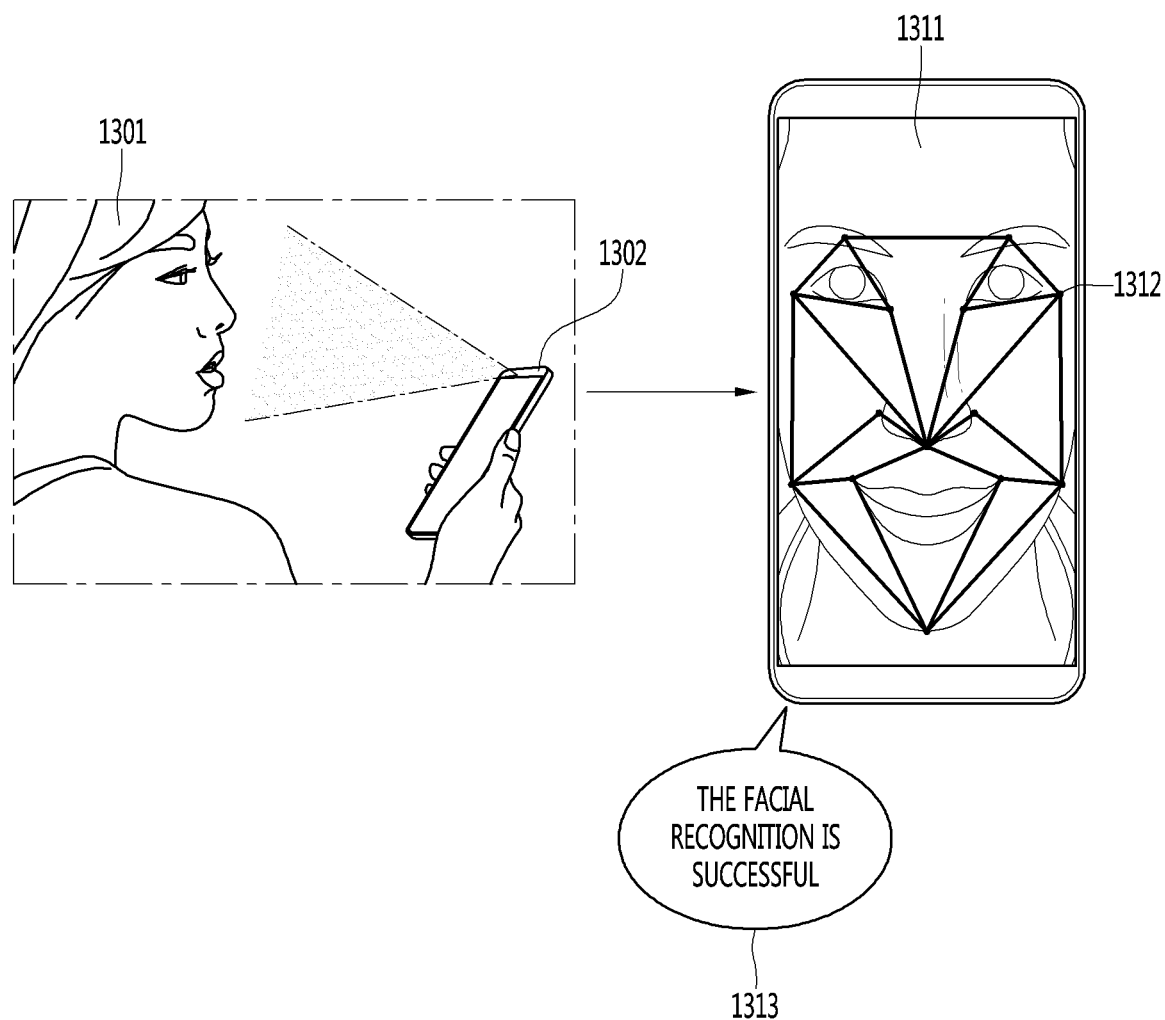
FIG. 13 is a view illustrating an example in which a face of a user is successfully recognized according to an embodiment of the present invention.

FIG. 13 is a view illustrating an example of successfully recognizing a face of a user according to an embodiment of the present invention.

Referring to FIG. 13, a user 1301 may photograph a face using the camera included in the AI apparatus 1302 for facial recognition.

In this case, the recognition target object is the face of the user.

Here, the AI apparatus 1302 may output a message requesting facial recognition to the user 1301.

In addition, the AI apparatus 1302 may acquire image data 1311 including the face of the user 1301, and may recognize the face of the user 1301 by extracting features 1312 for facial recognition from the image data 1311.

The AI apparatus 1302 may configure identification information specifying the user 1301 with the features 1312 for the face of the user 1301, and may determine whether the facial recognition is successful, based on similarity determination between the identification information stored in the AI apparatus 1302 and the identification information acquired from the image data 1311.

The AI apparatus 1302 may include the entire face of the user 1301 in the image data 1311 to thereby successfully recognize the face, and may output a notification such as "The facial recognition is successful" (1313).

Figure 14:
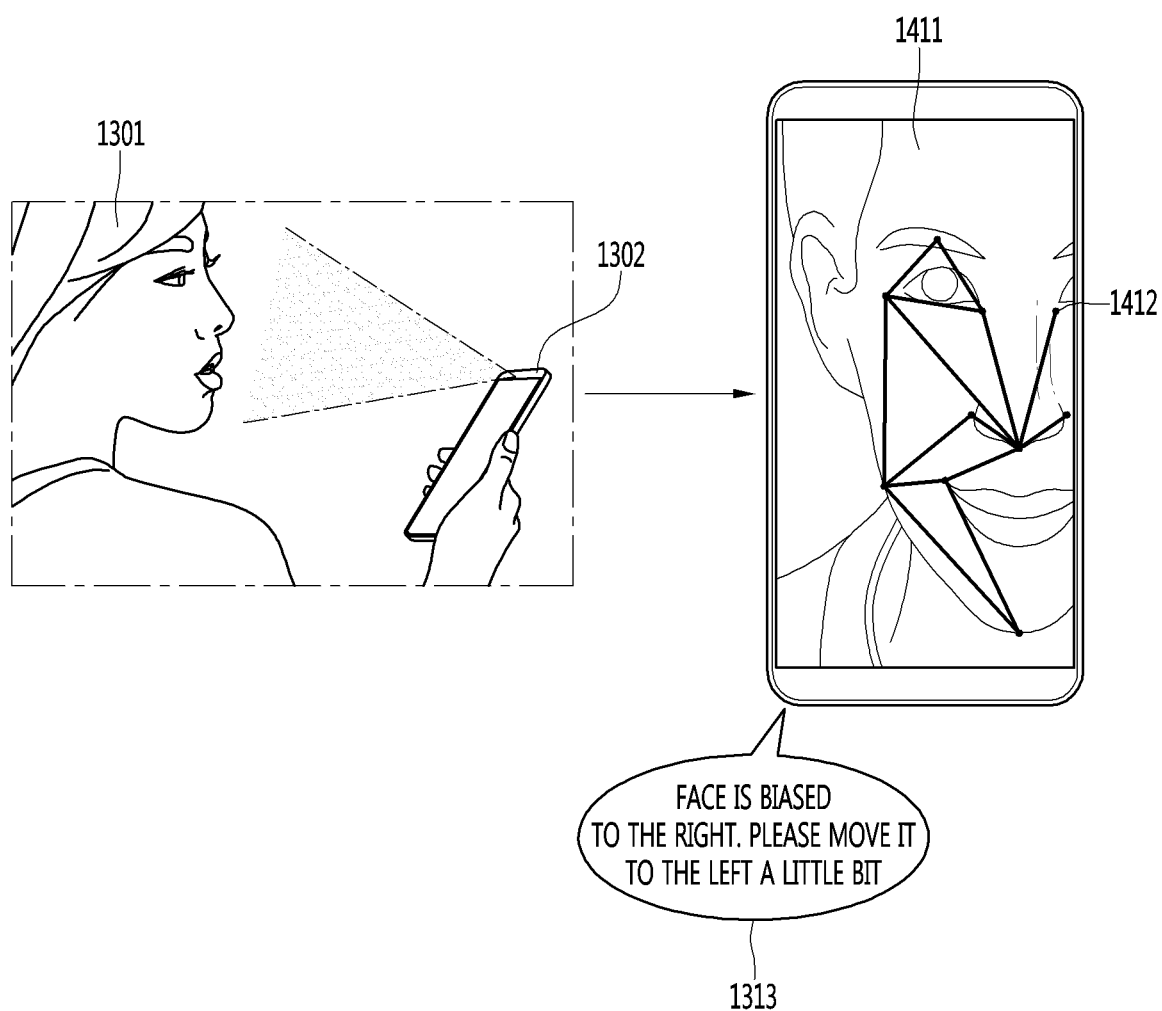
FIGS. 14 to 16 are views illustrating examples in which a face of a user is not successfully recognized according to an embodiment of the present invention.
Figure 15:
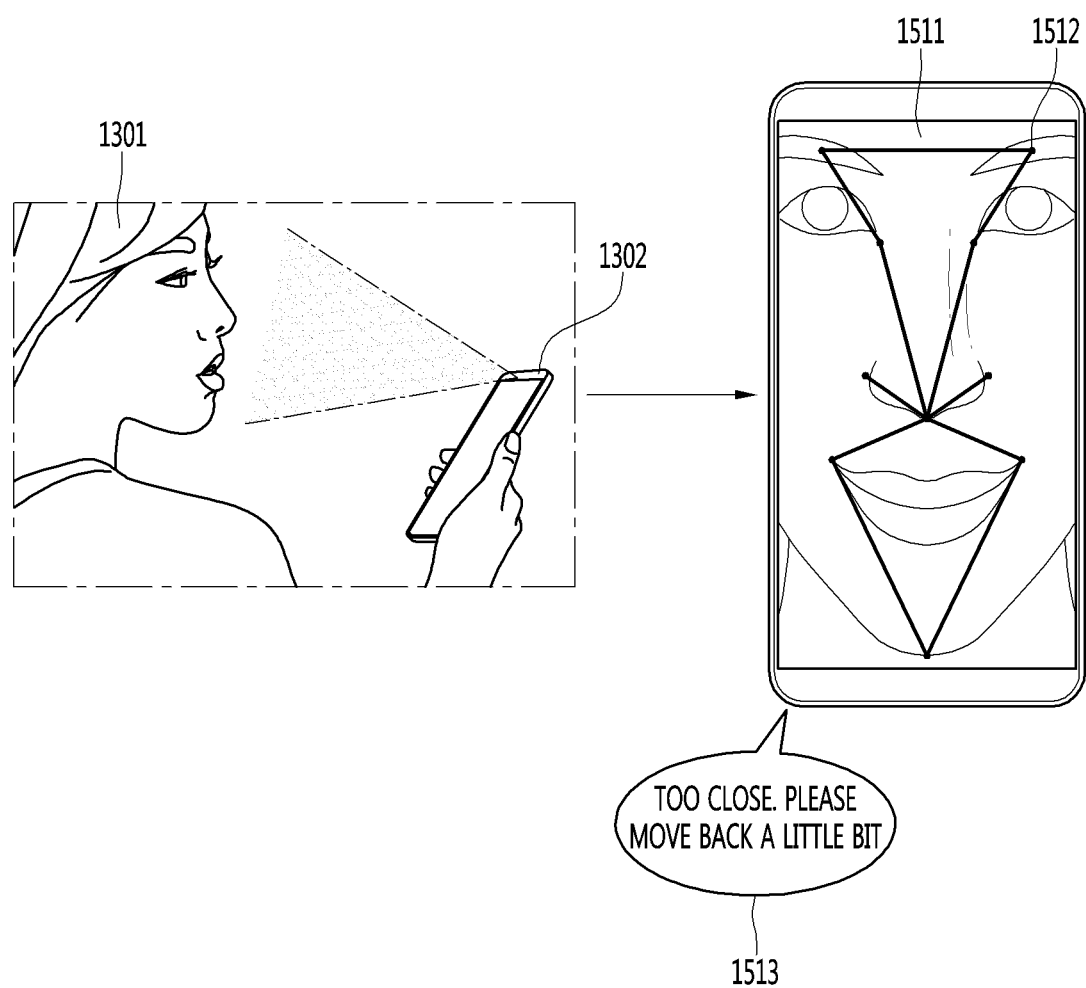
Figure 16:
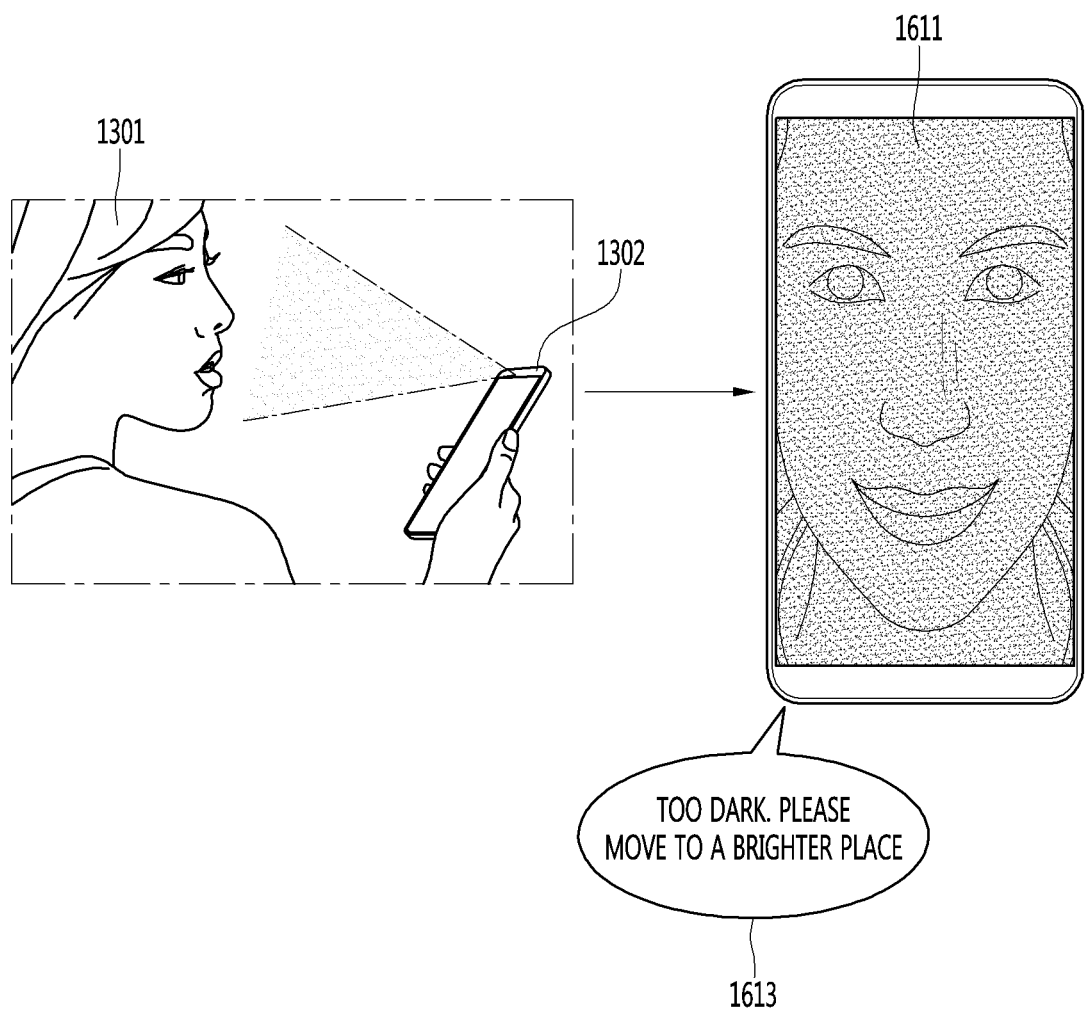

FIGS. 14 to 16 are views illustrating examples of not successfully recognizing a face of a user according to an embodiment of the present invention.

The face of the user 1301 is biased to the right, and only a part of the face of the user 1301 is included in the image data 1411 of FIG. 14.

The AI apparatus 1302 may attempt to recognize the face of the user 1301 by extracting features 1412 for facial recognition of the user 1301 from the acquired image data 1411. However, since the image data 1411 includes only the features 1412 that are insufficient to identify the user 1301, the AI apparatus 1302 may fail to recognize the face. The AI apparatus 1302 may grasp the cause of the facial recognition failure and may output a notification such as "The face is biased to the right. Please move it to the left a little bit" (1413)

Image data 1511 of FIG. 15 includes a part of the face of the user 1301 in a large size because the user 1301 is close to the AI apparatus 1302.

The AI apparatus 1302 may attempt to recognize the face of the user 1301 by extracting features 1511 for facial recognition of the user 1301 from the acquired image data 1512. However, since the image data 1511 includes only the features 1512 that are insufficient to identify the user 1301, the AI apparatus 1302 may fail to recognize the face. The AI apparatus 1302 may grasp the cause of the facial recognition failure and may output a notification such as "Too close. Please move back a little bit" (1513)

Image data 1611 of FIG. 16 is photographed in a dark place to have low illuminance or lightness.

The AI apparatus 1302 attempts to extract features for facial recognition of the user 1301 from the acquired image data 1611. However, the AI apparatus 1302 may fail to extract features due to low illuminance or brightness of the image data 1611. The AI apparatus 1302 may grasp the cause of the face recognition failure and may output a notification such as "Too dark. Please move to a brighter place" (1613).

In addition, the AI apparatus 1302 may additionally output a current recognition rate or a matching rate of the recognition information.

For example, the AI apparatus 1302 may output a notification such as "70% match with Smith, but recognition performance is below a threshold. The face is turning to the right, so turn the face to the left a little bit."

Figure 17:
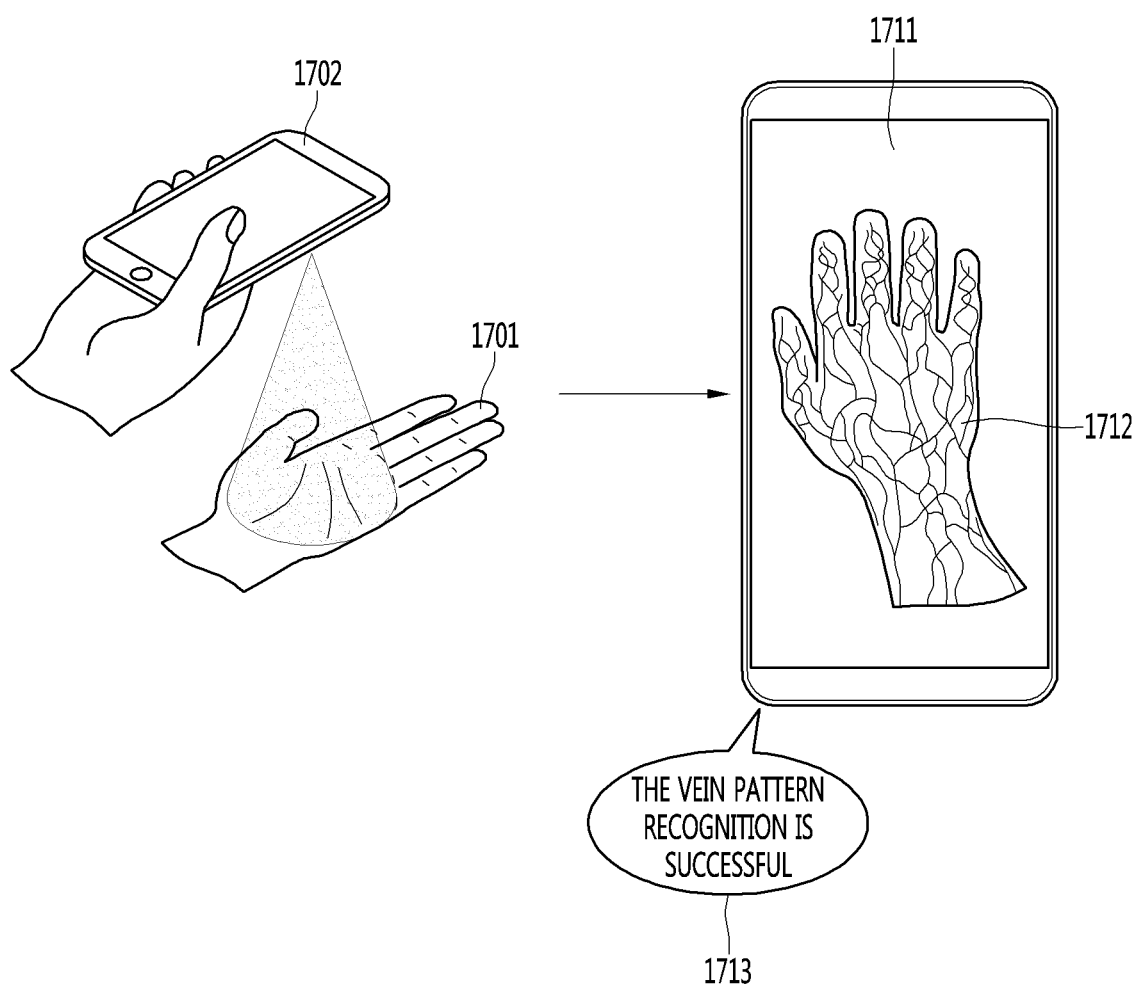
FIG. 17 is a view illustrating an example in which a vein pattern of a user is successfully recognized according to an embodiment of the present invention.

FIG. 17 is a view illustrating an example in which a vein pattern of a user is successfully recognized according to an embodiment of the present invention.

Referring to FIG. 17, a user may photograph a hand 1701 using the camera included in the AI apparatus 1702 so as to recognize a vein pattern of the hand 1701.

In this case, the recognition target object is the hand of the user. The camera may include an optical sensor of a near infrared band for recognizing the vein pattern.

Here, the AI apparatus 1702 may output a message requesting vein pattern recognition to the user.

The AI apparatus 1702 may acquire image data 1711 including the hand 1701 of the user, and may recognize the vein pattern by extracting the vein 1712 from the image data 1711.

The AI apparatus 1702 may construct identification information identifying the user with the vein 1712 of the hand 1701 of the user, and may determine whether the vein pattern recognition is successful, based on similarity determination between the identification information stored in the AI apparatus 1702 and the identification information acquired from the image data 1711.

The AI apparatus 1702 may include the entire hand 1701 of the user in the image data 1711 to thereby successfully recognize the vein pattern, and may output a notification such as "The vein pattern recognition is successful" (1713).

Figure 18:
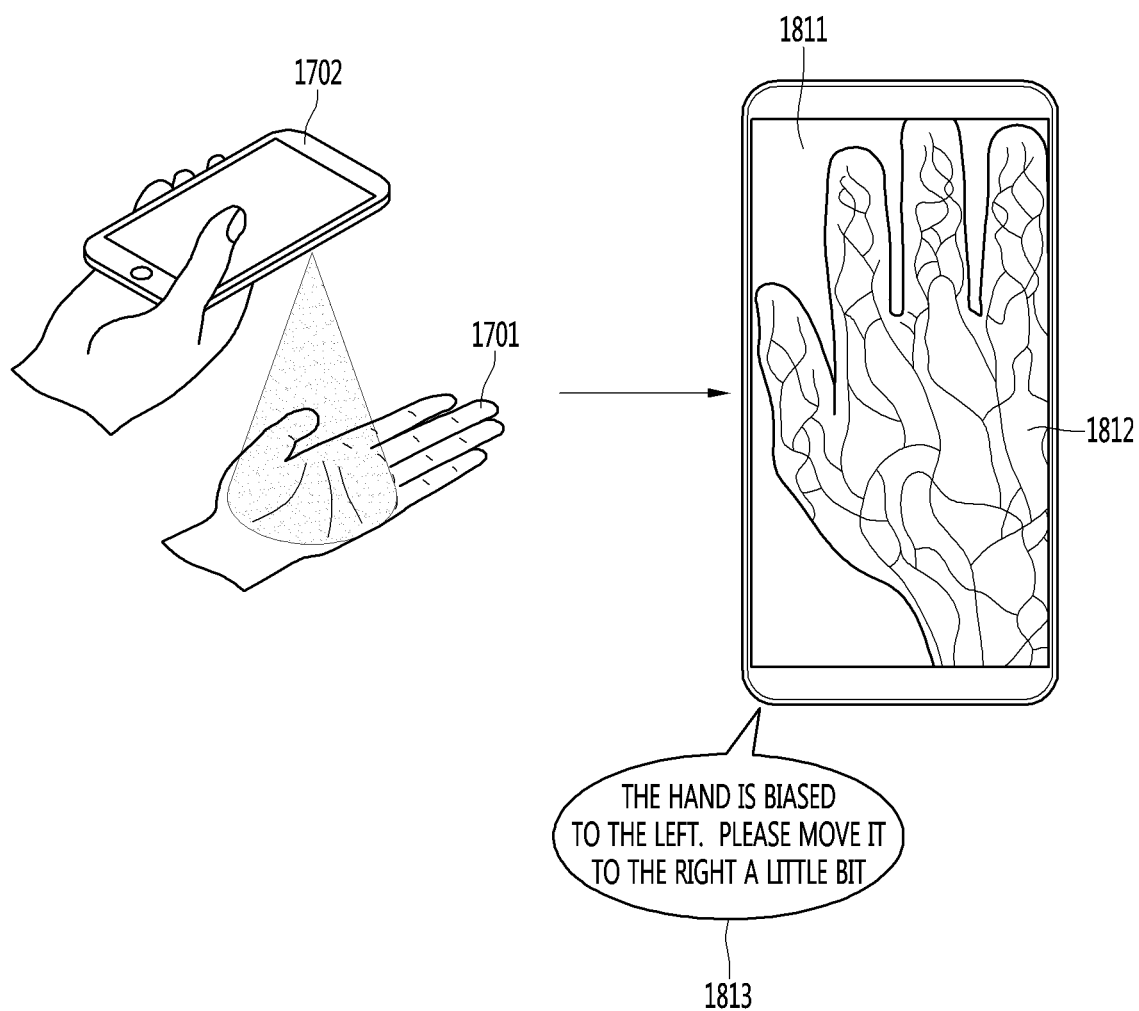
FIG. 18 is a view illustrating an example in which a vein pattern of a user is not successfully recognized according to an embodiment of the present invention.

FIG. 18 is a view illustrating an example in which a vein pattern of a user is not successfully recognized according to an embodiment of the present invention.

The hand 1701 of the user is biased to the left, and only a part of the hand 1701 of the user is included in image data 1811 of FIG. 18.

The AI apparatus 1702 may extract a vein 1812 from the acquired image data 1811, and attempt to recognize the vein pattern of the user based on the extracted vein 1812. However, since the image data 1811 includes the vein 1812 that is insufficient to identify the vein pattern of the user, the AI apparatus 1702 may fail to recognize the vein pattern. The AI apparatus 1702 may grasp the cause of the vein pattern recognition failure and may output a notification such as "The hand is biased to the left. Please move it a little to the right" (1813).

In addition, the AI apparatus 1702 may additionally output a current recognition rate or a matching rate of the recognition information (or identification information).

The AI apparatus 1702 may output a notification such as "only 60% of the entire area was recognized. Please move your hands a little farther."

Figure 19:
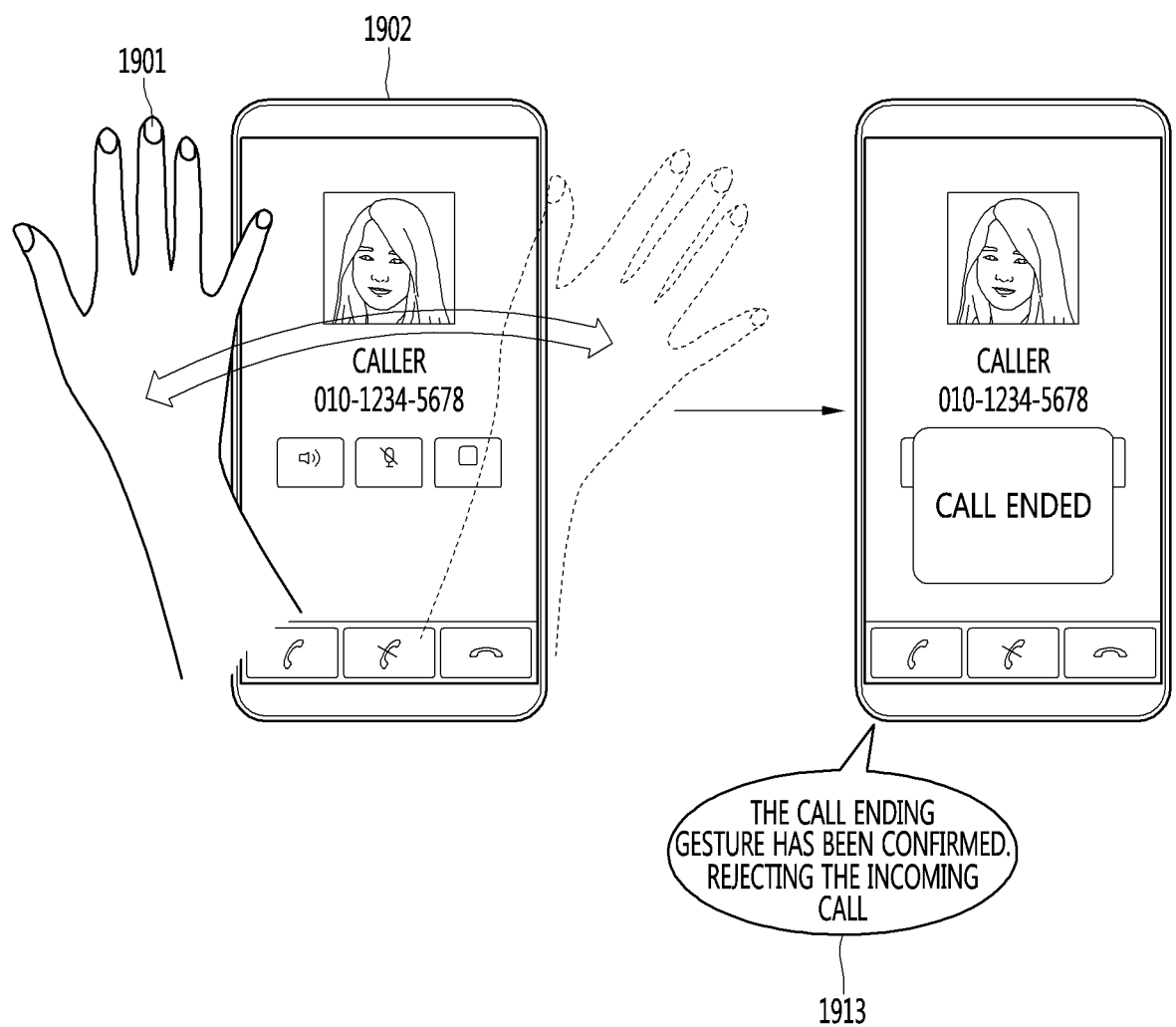
FIG. 19 is a view illustrating an example in which a gesture of a user is successfully recognized according to an exemplary embodiment.

FIG. 19 is a view illustrating an example in which a gesture of a user is successfully recognized according to an exemplary embodiment.

Referring to FIG. 19, a user may photograph a hand 1901 using the camera included in the AI apparatus 1902 so as to recognize a gesture of the hand 1901.

In this case, the recognition target object is the hand of the user.

Here, the AI apparatus 1902 may output a message requesting gesture input from the user.

The AI apparatus 1902 may acquire image data including the hand 1901 of the user, and may recognize the gesture by recognizing the hand 1901 of the user and the movement of the hand from image data.

The AI apparatus 1902 may construct action information from the movement of the hand 1901 of the user, and may determine whether the gesture recognition is successful, based on similarity determination between the action information of the gesture stored in the AI apparatus 1902 and the action information acquired from the image data.

The AI apparatus 1902 may include the entire hand 1901 of the user in the image data to thereby successfully recognize the gesture, and may output a notification such as "The call ending gesture has been confirmed. Rejecting the incoming call." (1913).

Figure 20:
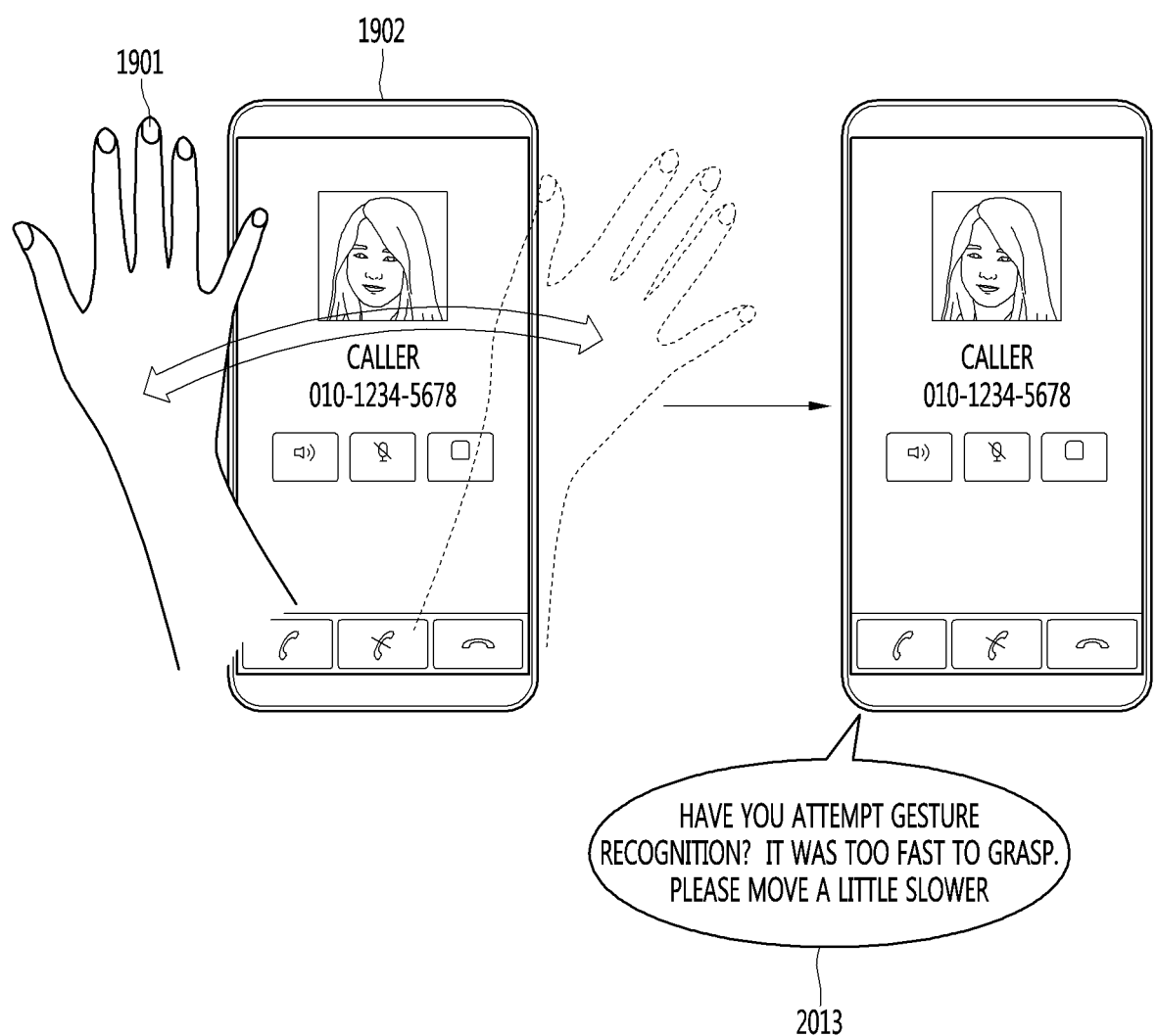
FIG. 20 is a view illustrating an example in which a gesture of a user is not successfully recognized according to an embodiment of the present invention.

FIG. 20 is a view illustrating an example in which a gesture of a user is not successfully recognized according to an embodiment of the present invention.

In FIG. 20, it is assumed that a user attempts to recognize a gesture while moving a hand 1901 very quickly.

The AI apparatus 1902 may generate action information by recognizing the hand 1901 of the user and the movement of the hand from the acquired image data, and may attempt to recognize the gesture of the user based on the generated action information. However, the AI apparatus 1902 may fail to recognize the gesture of the user because the movement of the hand 1901 of the user is too fast. The AI apparatus 1902 may grasp the cause of the gesture recognition failure and may output a notification such as "Have you attempt gesture recognition? It was too fast to grasp. Please move a little slower." (2013).

According to various embodiments of the present invention, when recognizing the object from the image data, it is possible to previously determine whether the recognition is accurately performed. Only when the recognition is accurately performed, a control corresponding to the recognition can be performed to prevent inaccurate control due to in accurate object recognition.

In addition, according to various embodiments of the present invention, if the object is not accurately recognized from the image data, the factor lowering the confidence level of the recognition can be grasped, and the factor lowering the confidence level of the recognition or the method for increasing the confidence level of the recognition, thereby increasing user convenience and increasing the confidence level of the recognition.

According to an embodiment of the present invention, the above-described method may be implemented as a processor-readable code in a medium where a program is recorded. Examples of a processor-readable medium may include read-only memory (ROM), random access memory (RAM), CD-ROM, a magnetic tape, a floppy disk, and an optical data storage device.

What is claimed is:

1. An artificial intelligence apparatus for recognizing a user, comprising:
a camera; and
a processor configured to:
receive, via the camera, image data including a recognition target object;
generate recognition information corresponding to the recognition target object from the received image data;
calculate a confidence level of the generated recognition information;
determine whether the calculated confidence level is greater than a reference value;
if the calculated confidence level is greater than the reference value, perform a control corresponding to the generated recognition information; and
if the calculated confidence level is not greater than the reference value:
extract an image feature set including a plurality of image features from the received image data;
determine whether each of the plurality of image features is out of corresponding normal ranges;
determine whether each of the plurality of image features is an abnormal feature according to the determination result using an abnormal feature determination model,
wherein the abnormal feature determination model includes ranking information between the normal ranges corresponding to each of the plurality of image features, and
wherein a ranking between the normal ranges is higher as influence on the confidence level is greater; and
provide a feedback for the object recognition based on the determination using the abnormal feature determination model.

2. The artificial intelligence apparatus according to claim 1, wherein the processor is further configured to acquire cause information lowering the calculated confidence level and generate the feedback based on the acquired cause information based on the calculated confidence level not being greater than the reference value.

3. The artificial intelligence apparatus according to claim 1, wherein the processor is further configured to generate the feedback including at least one of contents for notifying information about the abnormal feature as the cause lowering the confidence level or contents for proposing a method for changing the abnormal feature to a normal feature for increasing the confidence level.

4. The artificial intelligence apparatus according to claim 1, wherein the image feature set includes at least one of brightness, saturation, illumination, hue, noise level, blur level, frequency-based feature, energy level or depth, object area, or object position.

5. The artificial intelligence apparatus according to claim 1, wherein the processor is further configured to generate the feedback in consideration of the abnormal feature and the ranking information.

6. The artificial intelligence apparatus according to claim 1, wherein the recognition target object includes a part of a body of the user.

7. The artificial intelligence apparatus according to claim 6, wherein the recognition information includes at least one of identification information corresponding to the recognition target object or action information corresponding to the recognition target object.

8. The artificial intelligence apparatus according to claim 7, wherein the processor is further configured to generate the recognition information corresponding to the recognition target object from the received image data using an object recognition model.

9. The artificial intelligence apparatus according to claim 8, wherein the object recognition model is learned using a machine learning algorithm or a deep learning algorithm and is configured as an artificial neural network.

10. A method for recognizing a user, comprising:
receiving, via a camera, image data including a recognition target object;
generating recognition information corresponding to the recognition target object from the received image data;
calculating a confidence level of the generated recognition information;
determining whether the calculated confidence level is greater than a reference value; and
based on a determination that the calculated confidence level is not greater than the reference value:
extracting an image feature set including a plurality of image features from the received image data if the calculated confidence level is not greater than the reference value;
determining whether each of the plurality of image features is out of corresponding normal ranges;
determining whether each of the plurality of image features is an abnormal feature according to the determination result using an abnormal feature determination model, wherein the abnormal feature determination model includes ranking information between the normal ranges corresponding to each of the plurality of image features, and wherein a ranking between the normal ranges is higher as influence on the confidence level is greater; and providing a feedback for the object recognition based on the determination using the abnormal feature determination model.

11. A machine-readable non-transitory recording medium having recorded thereon machine-executable instructions for recognizing a user, the instructions comprising:

receiving, via a camera, image data including a recognition target object;

generating recognition information corresponding to the recognition target object from the received image data;

calculating a confidence level of the generated recognition information;

determining whether the calculated confidence level is greater than a reference value;

if the calculated confidence level is greater than the reference value, performing a control corresponding to the generated recognition information; and if the calculated confidence level is not greater than the reference value:

extracting an image feature set including a plurality of image features from the received image data if the calculated confidence level is not greater than the reference value;

determining whether each of the plurality of image features is out of corresponding normal ranges;

determining whether each of the plurality of image features is an abnormal feature according to the determination result using an abnormal feature determination model, wherein the abnormal feature determination model includes ranking information between the normal ranges corresponding to each of the plurality of image features, and wherein a ranking between the normal ranges is higher as influence on the confidence level is greater; and providing a feedback for the object recognition based on the determination using the abnormal feature determination model.

* * * * *